(12) United States Patent
Fernandez

(10) Patent No.: US 6,550,950 B1
(45) Date of Patent: Apr. 22, 2003

(54) LIGHT EMITTING DIODES VEHICLE LAMP

(76) Inventor: Robert A. Fernandez, 8620 NW. 190 Ter., Miami, FL (US) 33015

( * ) Notice: Subject to any disclaimer, the term of this patent is extended or adjusted under 35 U.S.C. 154(b) by 0 days.

(21) Appl. No.: 09/999,283

(22) Filed: Nov. 27, 2001

(51) Int. Cl.[7] .................................................. F21S 8/10
(52) U.S. Cl. ....................... 362/545; 362/543; 362/800; 362/540
(58) Field of Search ................................ 362/545, 541, 362/540, 544, 800, 812; 40/441, 581, 556

(56) References Cited

U.S. PATENT DOCUMENTS

| | | | | |
|---|---|---|---|---|
| 4,868,719 A | * | 9/1989 | Kouchi et al. ............... 362/545 |
| 4,928,084 A | * | 5/1990 | Reiser ......................... 340/479 |
| 5,373,280 A | | 12/1994 | Louy | |
| 5,436,809 A | | 7/1995 | Brassier | |
| 5,604,480 A | * | 2/1997 | Lamparter ................... 362/478 |
| 6,250,788 B1 | * | 6/2001 | Muller ......................... 362/541 |

* cited by examiner

*Primary Examiner*—Thomas M. Sember
*Assistant Examiner*—Hargobind S. Sawhney
(74) *Attorney, Agent, or Firm*—Alvin S. Blum

(57) ABSTRACT

A vehicle lamp for attachment and for electrical connection to a motor vehicle includes a housing enclosing an array of light emitting diodes. The housing has a light transmitting cover for sealing and protecting the diodes. The diodes emit light of at least two colors. The colors may be selected by a control that may be a remote control. One of the colors may be that associated with fog lights. An array of emitters is disposed to spell out a word such as alarm or help. The device may include an array of sockets adapted to receive plug-in diodes so that the consumer may spell out a particular word such as a name to personalize the light. The emitters may be strobed for emphasis. One or more emitters may be wired to emit light only when the running lights are on and the vehicle battery voltage is below a preset value.

9 Claims, 3 Drawing Sheets

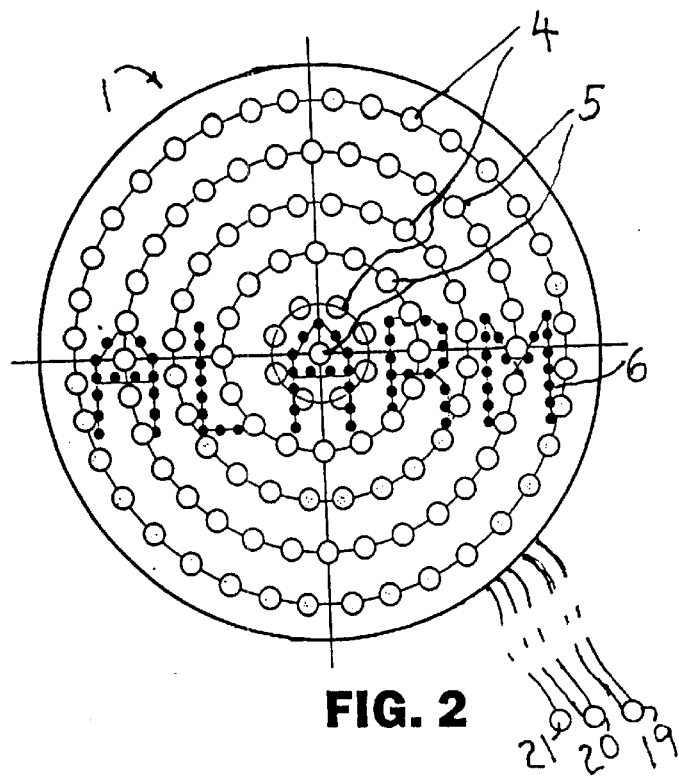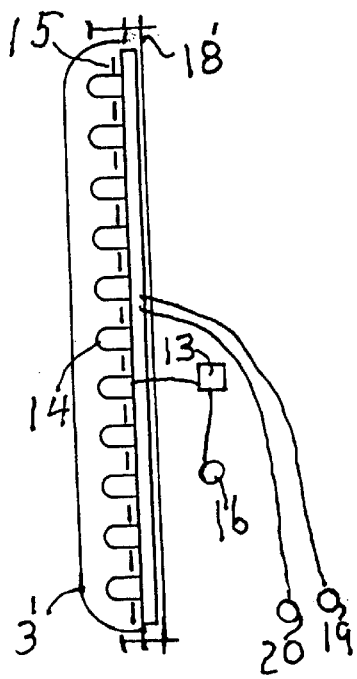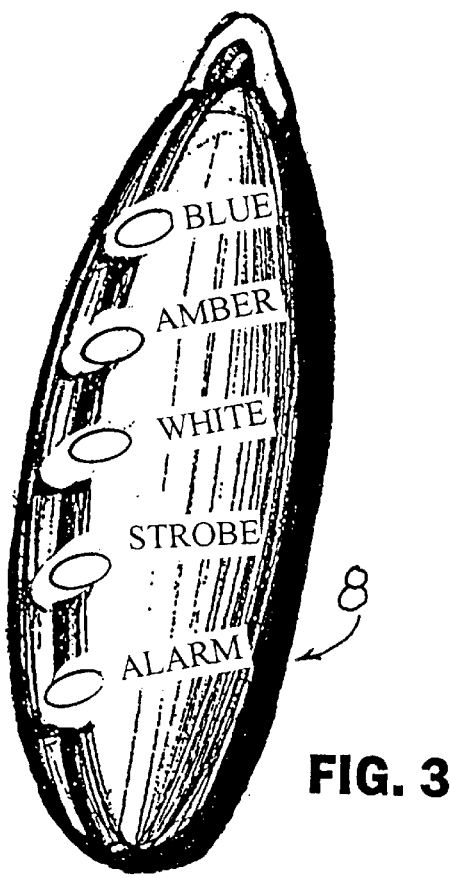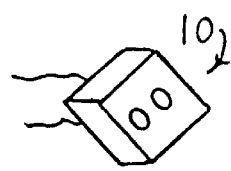

LIGHT EMITTING DIODES VEHICLE LAMP

This invention relates to electrically powered lamps for vehicles, and more particularly to a housing for mounting on a motor vehicle that contains a plurality of light emitting diodes that perform a variety of functions.

BACKGROUND OF THE INVENTION

Conventional vehicle lamps use incandescent bulbs that generate heat that must be dissipated. They are large, expensive, and require frequent replacement. Light emitting diodes (LEDs) offer many features that can enhance the performance and function of vehicle lights such as fog lights and running lights.

SUMMARY OF THE INVENTION

It is accordingly an object of the invention to provide a variety of vehicle lamp assemblies that offer enhanced operation as well as advanced functions.

A common housing contains a fog light (amber or yellow LEDs) surrounding an area of another color and a rectangular area with red LEDs that spell out ALARM and another set may be provided that spells out HELP. Each is separately powered and may be strobed. In order to have a section that may spell out a custom name by plug-in elements, each element has a common voltage requirement and a common supply of that voltage. A remote RF control can be provided so that each array of LEDs may be selectively activated. An array may be strobed if desired.

One or more high output LEDs may also be provided within the housing that are powered when the running lights are on and the vehicle voltage is below a preset value. They are arranged to be fully powered by the lower voltage to provide a safety feature.

These and other objects, features, and advantages of the invention will become more apparent when the detailed description is studied in conjunction with the drawings in which like elements are designated by like reference characters in the various drawing figures.

BRIEF DESCRIPTION OF THE DRAWINGS

FIG. 2 is a plan view of the light emitting diode assembly.

FIG. 3 is a perspective view of the remote control.

FIG. 4 is a rear view of the control of FIG. 3.

FIG. 5 is a sectional view of another embodiment of the invention.

FIG. 7 is a perspective view of a plug in diode.

FIG. 8 is a perspective view of a plug in socket.

DETAILED DESCRIPTION OF PREFERRED EMBODIMENTS

Figure 1:
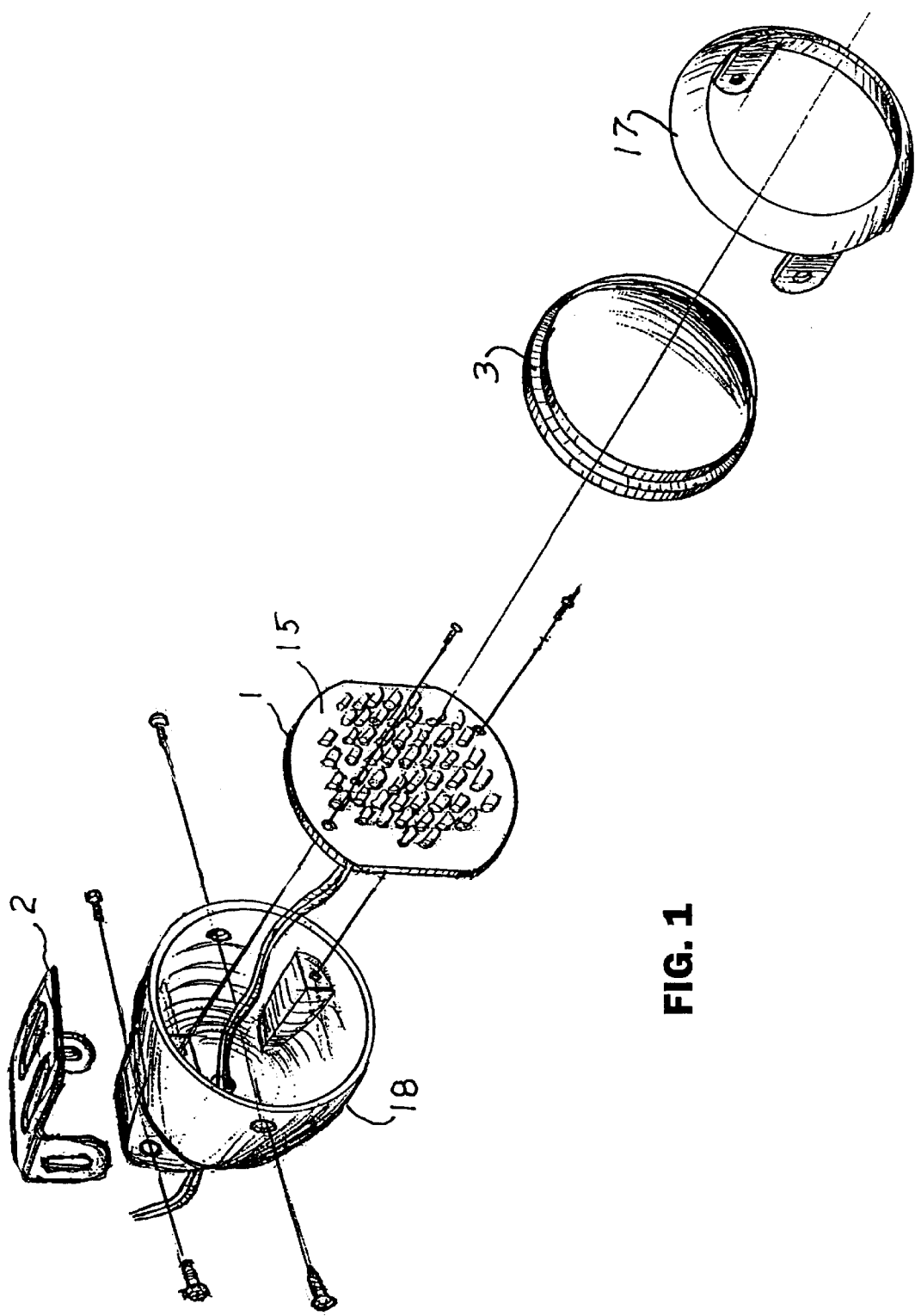
FIG. 1 is an exploded view of the invention.

Referring now first to the drawing FIGS. 1 and 2, housing 18 of conventional appearance is mounted on a vehicle by housing securing means 2. A light assembly board 1 is secured within the housing and covered by clear colorless lens or cover 3 held in place by bezel 17 in a manner familiar to the art for ready customer acceptance. The light assembly 1 may be retrofitted to an existing housing to replace the original light emitters. The light assembly 1 comprises a first plurality of emitters 4 that emit light of a color such as yellow or amber that is associated with fog lights. They are powered by a common supply circuit 19. A second plurality of emitters 5 emits light of another color not associated with fog lights, such as white or green. They are powered by a common circuit 20. A third plurality of emitters 6 may emit red light, for example, disposed to spell out a particular word, such as HELP or ALARM. They are powered by a common circuit 21. Each of these plurality of emitters may be separately energized and may be strobed, if desired. Referring now to FIGS. 3 and 4, a wireless remote control device 8 with pocket clip 9 may be provided for selectively energizing one or more of the pluralities, or strobing them.

Referring now to FIG. 5, another embodiment of the invention is shown that takes full advantage of the LED features to provide a broad thin housing 18'. The clear lens cover 3' may be molded in place to embed the LEDs, or fastened in place as shown here. This embodiment features one or more high-output LEDs 14 that are wired to operate at a lower vehicle voltage through low voltage switch 13 connected to the vehicle running light circuit 16. The switch connects the emitters 14 when the running light voltage is below a preset voltage. This enables the driver to continue to drive at night when the battery voltage is too low to operate the regular vehicle lights. The emitters may be mounted on a light reflective film 15 for further safety function.

Figure 6:
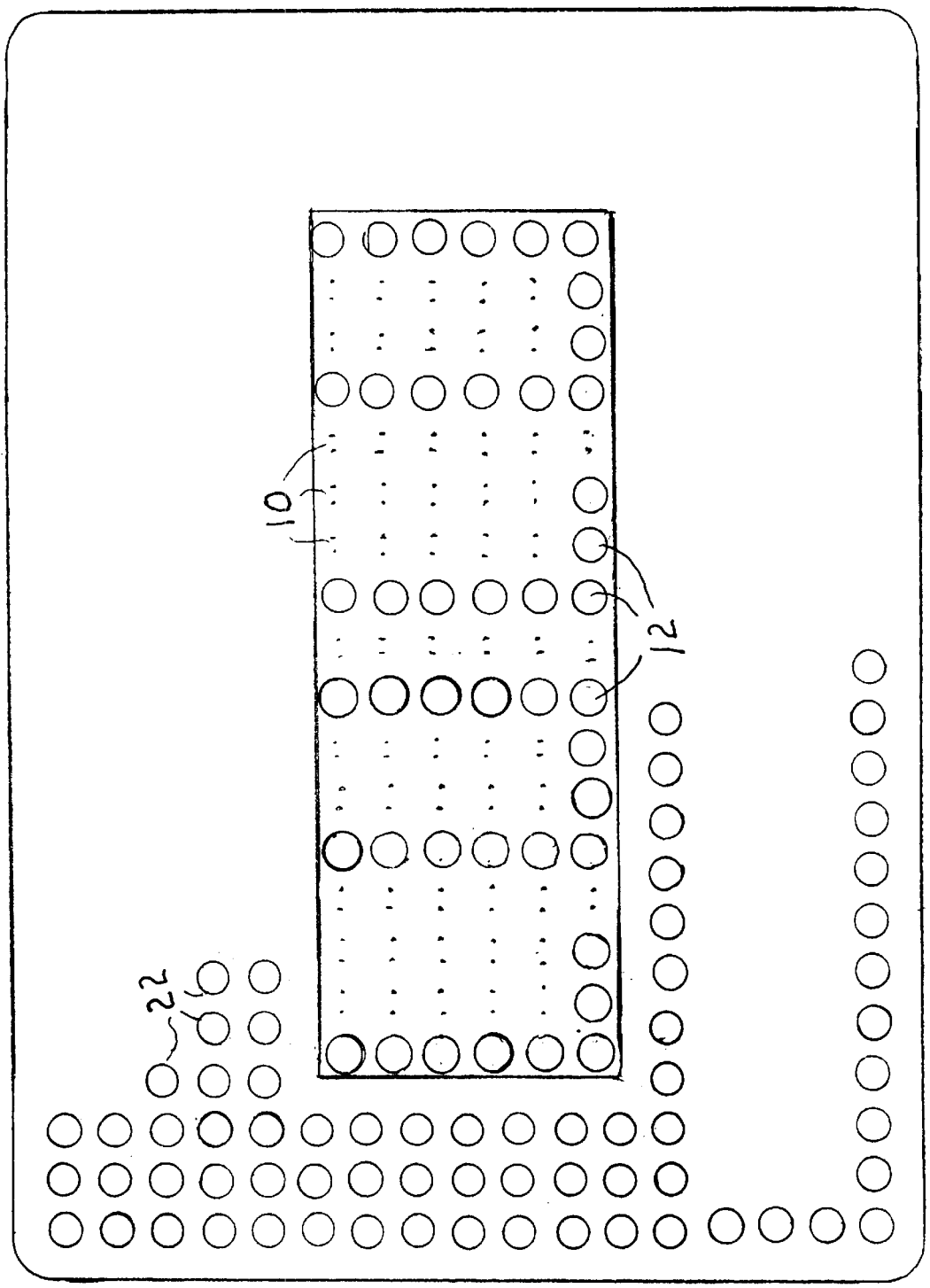
FIG. 6 is a plan view of another embodiment of the invention.

Referring now to FIGS. 6–8, another embodiment of the invention is shown in which a first plurality of emitters 22 powered by a first circuit is provided that surrounds a rectangular array of sockets 10. The lens cover is removable to enable the user to plug in a plurality of emitters 12 so as to spell out a word of the user's choice. Each emitter 12 may be provided with a dropping resistor 11, or the power to the sockets may be adjusted so that each socket has the proper power.

While I have shown and described the preferred embodiments of my invention, it will be understood that the invention may be embodied otherwise than as herein specifically illustrated or described, and that certain changes in form and arrangement of parts and the specific manner of practicing the invention may be made within the underlying idea or principles of the invention.

What is claimed is:

1. For a motor vehicle having an electric current supply, a light assembly comprising:
   a) a housing having an outward face;
   b) securing means for securing the housing to the vehicle;
   c) a light transmitting cover on the outward face;
   d) a first plurality of light emitting diodes within the housing that emit light of a first color selected from the group consisting of yellow and amber colors comparable to that of fog lights through the cover;
   e) a second plurality of light emitting diodes within the housing that emit light of a second color selected from the group consisting of colors that are not red and that are not comparable to that of said fog lights through the cover;
   f) a third plurality of light emitting diodes within the housing that emit light through the cover disposed in a manner to spell out a word; and
   g) connection means for selectively connecting each of said first second and third pluralities to the electric current supply as desired.

2. The light assembly according to claim 1 in which the housing emulates the appearance of fog lights of the prior art.

3. The light assembly according to claim 1 in which the connection means includes a remote control.

4. The light assembly according to claim 1 in which said first, second, and third pluralities may be selectively strobed.

5. The light assembly according to claim 1 in which the third plurality is further comprised of light emitting diodes of a variety that may be plugged in by the consumer and an array of sockets for receiving the diodes so that a word selected by the consumer may be spelled out by the diodes.

6. The light assembly according to claim 5 in which said first, second, and third pluralities may be selectively strobed.

7. For a motor vehicle having an electric current supply, a light assembly comprising:
   a) a housing having an outward face;
   b) securing means for securing the housing to the vehicle;
   c) a light transmitting cover on the outward face;
   d) a first plurality of light emitting diodes within the housing that emit light of a first color selected from the group consisting of yellow and amber colors comparable to that of fog lights through the cover;
   e) a second plurality of light emitting diodes within the housing that emit light through the cover disposed in a manner to spell out a word;
   f) connection means for selectively connecting each of the first and second pluralities to the electric current supply as desired; and
   g) in which said first and second pluralities may be selectively strobed.

8. For a motor vehicle having an electric current supply voltage, a light assembly comprising:
   a) a housing having an outward face;
   b) securing means for securing the housing to the vehicle;
   c) a light transmitting cover on the outward face;
   d) a first plurality of light emitting diodes within the housing that emit light of a first color through the cover;
   e) a second plurality of light emitting diodes within the housing that emit light of a second color through the cover disposed in a manner to spell out a word;
   f) connection means for selectively connecting each of the pluralities to the electric current supply as desired; and
   g) in which the first and second pluralities may be selectively strobed.

9. For a motor vehicle having an electric current supply voltage, a light assembly comprising:
   a) a housing having an outward face;
   b) securing means for securing the housing to the vehicle;
   c) a light transmitting cover on the outward face;
   d) a first plurality of light emitting diodes within the housing that emit light of a first color through the cover;
   e) a second plurality of light emitting diodes within the housing that emit light of a second color through the cover disposed in a manner to spell out a word;
   f) connection means for selectively connecting each of the pluralities to the electric current supply as desired; and
   g) at least one light emitting diode within the housing that is automatically activated to emit a useful amount of light when the vehicle running lights are on and the supply voltage is low.

* * * * *